United States Patent [19]
Gillissen et al.

[11] Patent Number: 5,640,077
[45] Date of Patent: Jun. 17, 1997

[54] BATTERY RECHARGING APPARATUS

[75] Inventors: Eduard E. A. Gillissen, Heerlen; Johann R. G. C. M. Van Beek; Gerardus E. M. Hannen, both of Eindhoven, all of Netherlands

[73] Assignee: U.S. Philips Corporation, New York, N.Y.

[21] Appl. No.: 639,993

[22] Filed: Apr. 26, 1996

[30] Foreign Application Priority Data

Apr. 30, 1995 [EP] European Pat. Off. ............ 95201111

[51] Int. Cl.$^6$ .................. H02J 7/00; G01L 1/22; H01M 2/10
[52] U.S. Cl. ........................ 320/2; 338/3; 429/96
[58] Field of Search ................... 320/2; 338/2, 3, 338/4; 429/96, 100

[56] References Cited

U.S. PATENT DOCUMENTS

| | | | |
|---|---|---|---|
| 3,665,756 | 5/1972 | Russell | 338/3 X |
| 3,805,601 | 4/1974 | Jeffers | 338/2 X |
| 4,522,067 | 6/1985 | Burger et al. | 338/3 X |
| 5,260,638 | 11/1993 | Hirahara | 320/46 |

FOREIGN PATENT DOCUMENTS

| | | | |
|---|---|---|---|
| 268445 | 7/1988 | Japan | H02J 7/04 |
| 326027 | 10/1993 | Japan | H01M 10/44 |

*Primary Examiner*—Peter S. Wong
*Assistant Examiner*—Patrick B. Law
*Attorney, Agent, or Firm*—Bernard Franzblau

[57] ABSTRACT

Apparatus for recharging a battery includes a compartment for accommodating the battery in a manner such that its electrical terminals are in contact with a pair of electrodes. The electrodes are connectable to respective poles of a controllable source of electrical energy. A strain gauge is positioned so as to make contact with a wall of the battery when the battery is in place in the compartment. The strain gauge includes a foil which carries a resistive element, each of the two extremities of the resistive element being connected to an electrical device via a separate contact wire, whereby the coefficient of thermal expansion of the strain gauge is substantially equal to that of the wall of the battery. The material of one of the contact wires, at its juncture with the resistive element, has a different Seebeck coefficient to the material of the other contact wire at its juncture with the respective element. The battery temperature can be monitored by measuring the DC voltage difference between the contact wires, whereas the mechanical deformation of the battery can be monitored by measuring the AC impedance of the resistive element, both of which measurements are independently conducted using the electrical device.

12 Claims, 2 Drawing Sheets

BATTERY RECHARGING APPARATUS

BACKGROUND OF THE INVENTION

This invention relates to an apparatus for recharging a battery, comprising a compartment for accommodating the battery in a manner such that its electrical terminals are in contact with a pair of electrodes, the electrodes being connectable to corresponding poles of a controllable source of electrical energy, further comprising a strain gauge which is positioned so as to make contact with a wall of the battery when the battery is in place in the compartment, the strain gauge comprising a foil which carries a resistive element, each of the two extremities of the resistive element being connected to electrical means via a separate contact wire.

The invention also relates to a method of monitoring both the mechanical deformation and the temperature of a battery during recharging.

The term "battery" is here intended to refer to either single cells or battery packs, and refers specifically to secondary (i.e. rechargeable) batteries.

An apparatus as specified in the opening paragraph is known from U.S. Pat. No. 5,260,638 and from laid-open Japanese Patent Applications JP 63-268445 (filed 24.04.87) and JP 5-326027 (filed 22.05.92). These documents describe how the physical dimensions of a battery can change as a result of increased internal pressure and temperature during charging. Such increase is attributable to the occurrence of certain chemical reactions within the battery, the rate and type of which are determined by the battery's charge state at any given time. In particular, at the end of a charging procedure, additional electrical energy supplied to the battery will, in general, no longer cause an increase in its internal charge, but will instead provoke a sharp rise in the battery's internal pressure and temperature, causing the battery to expand (these effects being particularly prominent in NiCd and NiMH batteries). The strain gauge is employed to monitor any such mechanical deformation of the battery, and the detection of (the onset of) sharply increasing deformation can then be used as an indication that efficient charging has been completed, and that the electrical energy source should be switched off. Such action is particularly important in the case of so-called "quick charging", where the battery can be severely damaged if the charging process is not carefully monitored and interrupted in good time.

SUMMARY OF THE INVENTION

It is an object of the invention to provide an improvement of the above-described apparatus. In particular, it is an object of the invention to provide battery recharging apparatus with which, in addition to the mechanical deformation of the battery, the temperature of the battery can also be accurately and independently measured as a separate monitor of the battery's charge state. Moreover, it is an object of the invention that such temperature measurement should be performable using the strain gauge already present in the apparatus.

These and other objects are achieved in an apparatus as specified in the opening paragraph, characterised in that the coefficient of thermal expansion of the strain gauge is substantially equal to that of the wall of the battery, and that the material of one of the contact wires at its juncture with the resistive element has a different Seebeck coefficient to the material of the other contact wire at its juncture with the resistive element.

The invention hereby provides a method of monitoring both the mechanical deformation and the temperature of a battery during recharging, characterised in that the battery temperature can be monitored by measuring the DC voltage difference between the contact wires, whereas the mechanical deformation of the battery can be monitored by measuring the AC impedance of the resistive element. These measurements can be conducted, for example, by embodying the electrical means to comprise a Wheatstone bridge which is connected across an AC voltage source, whereby the resistive element of the strain gauge comprises one of the legs of the Wheatstone bridge.

A particular embodiment of the inventive apparatus is characterised in that the resistive element is comprised of a first metallic material, that one of the contact wires is comprised of a second metallic material, and that the other contact wire comprises two adjacent collinear segments, the segment nearest the resistive element being comprised of the first metallic material and the other segment being comprised of the second metallic material.

In a preferential embodiment of an apparatus as specified in the previous paragraph, the first metallic material comprises constantan, and the second metallic material is selected from the group comprising Cu, Al, Au, Ag, Fe, Sn, W, and their mixtures. In the case of a constantan/Cu junction, for example, the thermal DC voltage-difference across the junction amounts to approximately 35 µV/° C.

The strain gauge in the apparatus according to the invention may be mounted on the battery itself, or it may be positioned in the compartment in such a manner that it makes intimate mechanical and thermal contact with a wall of the battery. This latter scenario has the advantage that the inventive apparatus is then suitable for recharging different batteries, which can be inserted into or removed from the compartment without having to remove and replace the strain gauge each time. For example, the strain gauge can be mounted on one of the electrodes in the compartment, and elastic means (such as a spring) can be used to push the battery tightly against this electrode.

With the aid of calibration experiments, it is possible to independently monitor the mechanical deformation and the temperature of the battery as a function of charging time, while simultaneously measuring the charge supplied to the battery. When recharging the battery on subsequent occasions, the measured strain and/or temperature at any given time then allows the corresponding charge value to be deduced. In this way, the electrical voltage and/or current supplied to the battery during charging can, if so desired, be automatically tailored to particular requirements, by allowing the electrical means to administer the controllable source of electrical energy. For example, it is possible to automatically interrupt charging when the battery is 90% charged, or to slow down the charging procedure as charge saturation is approached. In any case, it is possible to automatically stop the charging procedure when a sudden increase in battery temperature or expansion is detected.

BRIEF DESCRIPTION OF THE DRAWINGS

The invention and its attendant advantages will be further elucidated with the aid of examplary embodiments and the accompanying schematic Figures, whereby.

DESCRIPTION OF THE PREFERRED EMBODIMENTS

Embodiment 1

Figure 1:
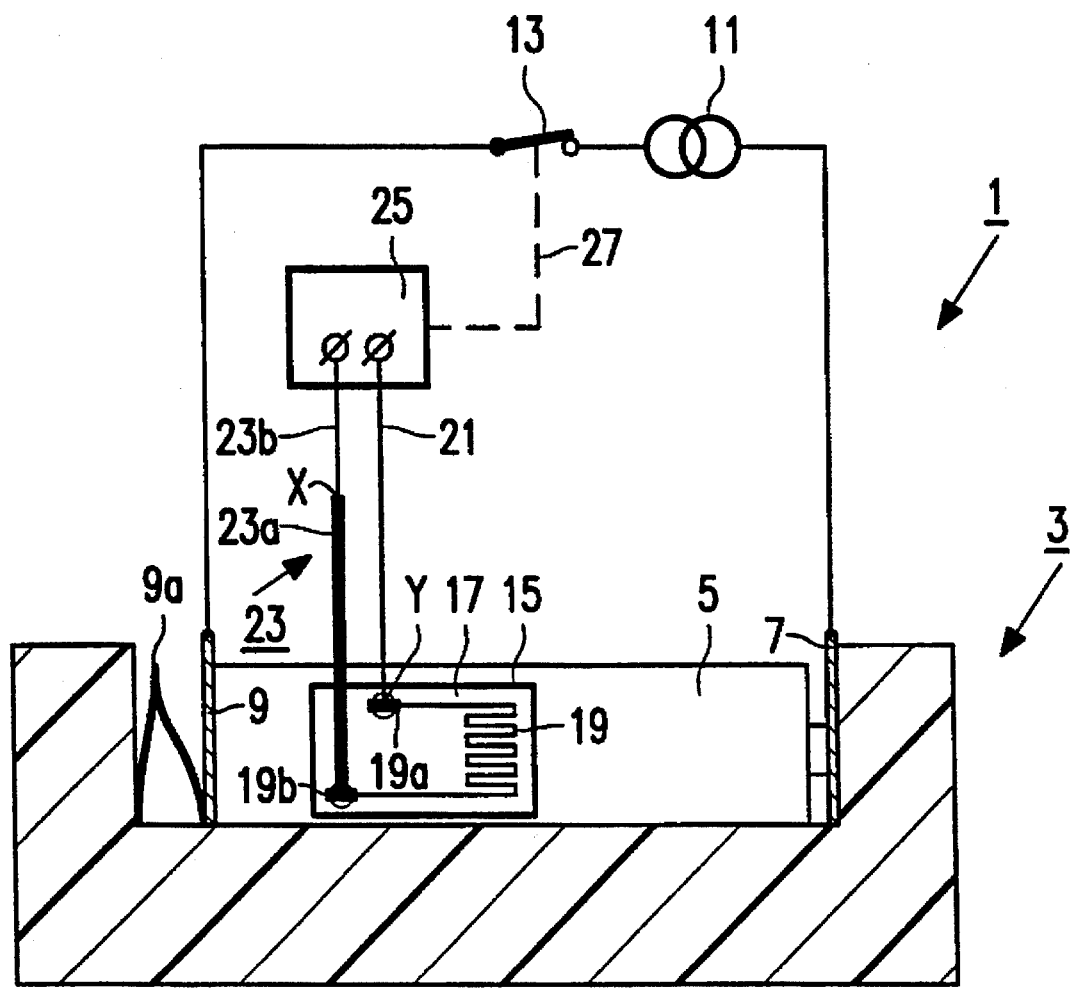
FIG. 1 depicts an apparatus in accordance with the invention.

FIG. 1 provides a schematic view of an apparatus 1 in accordance with the present invention. This apparatus 1 comprises a plastic compartment 3 for accommodating a battery 5. The battery 5 is thus positioned so that its terminals are in contact with a pair of electrodes 7, 9. These electrodes 7, 9 are in turn connected to a source 11 of electrical energy, which can be switched with the aid of a switch 13. The electrode 9 is pushed firmly against the battery 5 by elastic means 9a.

A strain gauge 15 is also shown, in this case pressed against a side wall of the battery 5. This strain gauge 15 comprises a foil 17 which carries a resistive element 19. This resistive element 19 has extremities 19a, 19b, which are connected to electrical means 25 via respective contact wires 21, 23. The resistive element 19 is comprised of constantan, and the contact wire 21 is comprised of Cu. On the other hand, the contact wire 23 is comprised of two adjacent collinear segments 23a, 23b, the segment 23a being comprised of constantan and the segment 23b being comprised of Cu. The apparatus 1 therefore comprises two constantan/Cu junctions, at the points X and Y.

Since constantan and Cu have different Seebeck coefficients (approximately −32.2 and +5.9 µV/° C., respectively), a temperature-dependent voltage difference will arise between points X and Y. This voltage difference can be measured by the electrical means 25. The electrical means 25 also serve to measure the AC impedance of the resistive element 19, which is a function of the strain exercised on the strain gauge 15.

In this way, the electrical means 25 can be employed to independently monitor both the temperature and the mechanical deformation of the battery 5 during recharging. In a particular embodiment of the inventive apparatus, the electrical means 25 supply a signal to the switch 13 via a signal carrier 27. Such a signal can serve to open the switch 13 automatically, e.g. once a sudden temperature rise and/or mechanical deformation have been detected.

Embodiment 2

Figure 2:
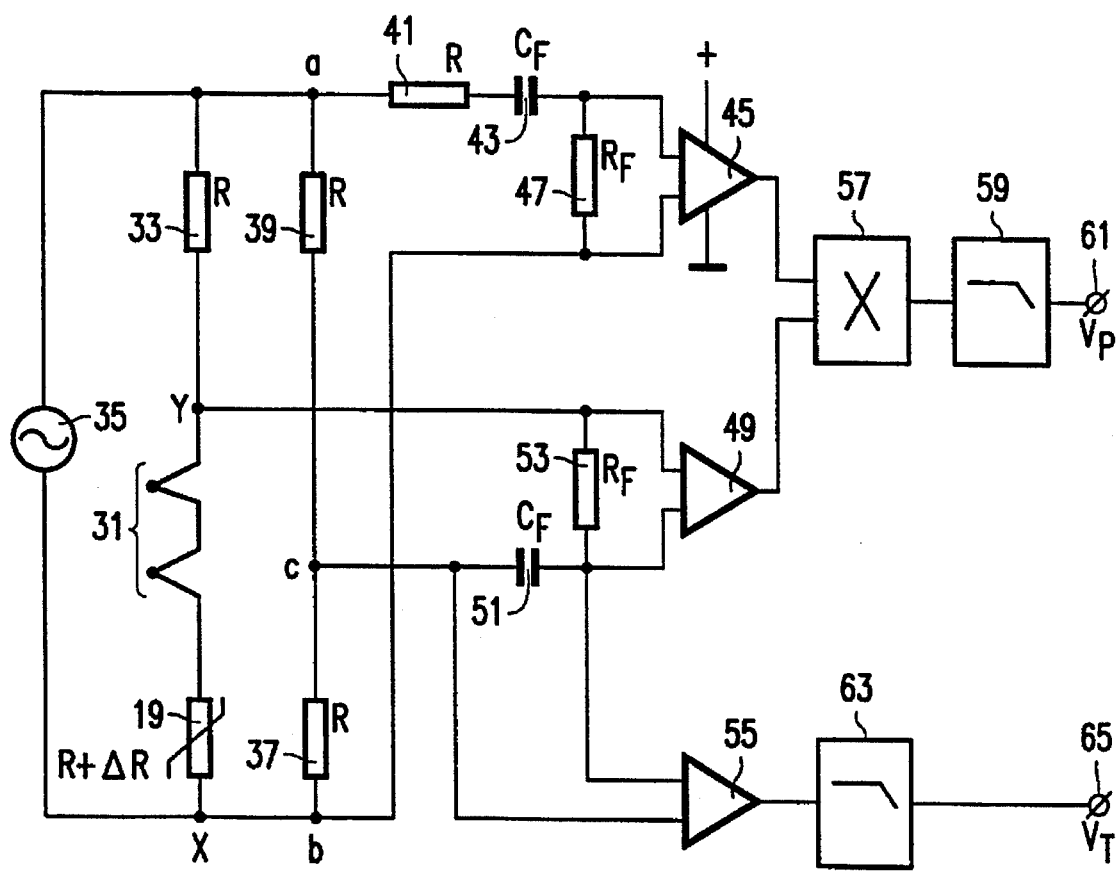
FIG. 2 depicts electrical means suitable for use in conjunction with the strain gauge in the apparatus of FIG. 1.

FIG. 2 depicts a suitable embodiment of the electrical means 25 employed to monitor the temperature and mechanical deformation of the battery 5 in FIG. 1. Corresponding features in FIGS. 2 and 1 are denoted by the same reference symbols.

The points X and Y delimit the extremities of a series-combination of a variable resistor 19 and a thermocouple 31, corresponding respectively to the resistive element 19 and the Seebeck temperature sensor of FIG. 1. The point Y is series-connected to a resistor 33, and the series combination 19, 31, 33 is connected across an AC voltage source 35, in parallel with a series-connected pair of resistors 37, 39. The series-connected resistor-pair 37, 39 is delimited by points a and b, and is saddled about a point c.

Point a is connected to one input of a comparator 45 via a series-connected resistor 41 and capacitor 43. Point b is connected directly to the other input of the comparator 45. A resistor 47 is connected across the two inputs of the comparator 45.

Point c is connected via a capacitor 51 to one input of an operational amplifier 49. Point Y is connected directly to the other input of the amplifier 49. A resistor 53 is connected across the two inputs of the amplifier 49.

The outputs of the comparator 45 and amplifier 49 are connected to respective inputs of a multiplier 57, whose output signal is passed to an output 61 via a low-pass filter 59.

The capacitor 51 is connected across the two inputs of an operational amplifier 55, whose output signal is passed to an output 65 via a low-pass filter 63.

The resistors 33, 37, 39 and 41 have a common value R, whereas the resistors 47 and 53 have a common value $R_F$. The capacitors 43 and 51 have a common value $C_F$. The AC voltage source 35 operates with a period τ. The values of R, $R_F$ and $C_F$ are thus chosen so that the relationships:

$R_F > R$ $R_F \times C_F > \tau$ are satisfied.

The measured voltage $V_p$ at the output 61 is dependent on the resistance value of the resistive element 19, which in turn depends on the pressure p exerted by the battery 5 on the strain gauge 15. On the other hand, the measured voltage $V_T$ at the output 65 is dependent on the voltage across the thermocouple 31, which in turn depends on the temperature T of the battery 5.

If so desired, the voltages $V_P$ and $V_T$ at the respective outputs 61, 65 may be passed to separate comparators (not depicted), where they can be compared with respective reference voltages $V_{po}$ and $V_{To}$. Referring to FIG. 1, either or both of the conditions:

$V_p = V_{po}$ $V_T = V_{To}$ can then be used to trigger a relay (via the carrier 27) so as to open (or close) the switch 13.

We claim:

1. Apparatus for recharging a battery, comprising: a compartment for accommodating the battery in a manner such that its electrical terminals are in contact with a pair of electrodes, the electrodes being connectable to corresponding poles of a controllable source of electrical energy, a strain gauge positioned so as to make contact with a wall of the battery when the battery is in place in the compartment, the strain gauge comprising a foil which carries a resistive element, each of two extremities of the resistive element being connected to electrical means via a separate contact wire, wherein the coefficient of thermal expansion of the strain gauge is substantially equal to that of the wall of the battery, and the material of one of the contact wires at its juncture with the resistive element has a different Seebeck coefficient than the material of the other contact wire at its juncture with the resistive element.

2. Apparatus according to claim 1, wherein the resistive element is comprised of a first metallic material, one of the contact wires is comprised of a second metallic material, and the other contact wire comprises two adjacent collinear segments, the segment nearest the resistive element being comprised of the first metallic material and the other segment being comprised of the second metallic material.

3. Apparatus according to claim 2, wherein the first metallic material comprises constantan, and the second metallic material is selected from the group comprising Cu, Al, Au, Ag, Fe, Sn, W, and their mixtures.

4. Apparatus according to claim 2, wherein the strain gauge is mounted on an elastic surface within the battery compartment, against which surface the battery exerts a force when it is in place in the compartment.

5. Apparatus according to claim 2, wherein the strain gauge is mounted on the battery itself.

6. Apparatus according to claim 1, wherein the strain gauge is mounted on the battery itself.

7. Apparatus according to claim 1, wherein said electrical means comprise:

a Wheatstone bridge having a pair of input terminals for connection to a source of AC voltage, first and second output terminals, and wherein said resistive element comprises one arm of the Wheatstone bridge, first means coupled to said first and second output terminals of the Wheatstone bridge for measuring a DC voltage between said contact wires thereby to monitor the battery temperature, and second means coupled to said pair of input terminals and to said first and second output terminals of the Wheatstone bridge for measuring the AC impedance of the resistive element thereby to monitor the internal pressure of the battery.

8. Apparatus according to claim 7, wherein said first means comprise:

an operational amplifier having one input coupled to the first output of the Wheatstone bridge and a second input coupled to the second output of the Wheatstone bridge via a first resistor and to the first output of the Wheatstone bridge via a first capacitor, and means coupling an output of the operational amplifier to an output terminal which provides a signal determined by the battery temperature.

9. Apparatus according to claim 8, wherein said second means comprise:

a comparator having a first input coupled to a first input terminal of said pair of input terminals of the Wheatstone bridge via a series circuit including a second resistor and a second capacitor, having a second input coupled to a second input terminal of said pair of input terminals of the Wheatstone bridge, and a third resistor coupled across the first and second inputs of the comparator, a second operational amplifier having first and second inputs coupled across the first resistor, a multiplier circuit having first and second inputs coupled to respective outputs of the comparator and the second operational amplifier and an output coupled to a further output terminal at which is provided a signal determined by the internal pressure of the battery.

10. Apparatus according to claim 8, wherein:

said Wheatstone bridge comprises second, third and fourth arms each including a resistor of resistance R, said first and third resistors each have a resistance $R_f$ and said second resistor has a resistance R, said first and second capacitors each have a capacitance $C_f$, and $R_f > R$ and $R_f \times C_f > \tau$, where $\tau$ is the period of the AC voltage.

11. Apparatus according to claim 1, further comprising switching means for selectively coupling said electrodes to said poles of the controllable source of energy, and wherein said electrical means control the operation of the switching means as a function of a voltage developed between the contact wires and of the resistance of the resistive element.

12. A method of monitoring both the mechanical deformation and the temperature of a battery during recharging, the method comprising: positioning a strain gauge in contact with wall of the battery, the strain gauge comprising a foil which carries a resistive element, connecting each of two extremities of the resistive element to electrical means via a separate contact wire, the strain gauge having a coefficient of thermal expansion which is substantially equal to that of the battery wall, the material of one of the contact wires at its juncture with the resistive element having a different Seebeck coefficient than the material of the other contact wire at its juncture with the resistive element, monitoring the battery temperature by measuring the DC voltage difference between the contact wires, and monitoring the mechanical deformation of the battery by measuring the AC impedance of the resistive element, each of which measurements are independently conducted using the electrical means.

* * * * *